United States Patent [19]

Quraishi

[11] 4,146,565

[45] Mar. 27, 1979

[54] ROTATIONAL MOLDING OF HOLLOW ARTICLES OF UNIFORM WALL THICKNESS

[76] Inventor: Abdul H. Quraishi, 22, Kineton Rd., Wellesbourne, Warwickshire, England

[21] Appl. No.: 771,300

[22] Filed: Feb. 23, 1977

Related U.S. Application Data

[63] Continuation of Ser. No. 597,482, Jul. 21, 1975, abandoned, which is a continuation-in-part of Ser. No. 353,294, Apr. 23, 1973, abandoned.

[30] Foreign Application Priority Data

Apr. 26, 1972 [GB] United Kingdom ............... 19331/72

[51] Int. Cl.$^2$ ................................................ B29C 5/04
[52] U.S. Cl. .................................... 264/310; 264/219; 425/429
[58] Field of Search ...................... 264/310, 311, 219; 425/429, 430

[56] References Cited

U.S. PATENT DOCUMENTS

| | | | |
|---|---|---|---|
| 2,893,057 | 7/1959 | Rekettye | 425/430 |
| 3,337,662 | 8/1967 | Spencer | 264/310 |
| 3,652,760 | 3/1972 | Petri | 264/310 |
| 3,754,071 | 8/1973 | Ernst et al. | 264/311 |

*Primary Examiner*—James B. Lowe
*Attorney, Agent, or Firm*—Frank J. Jordan

[57] ABSTRACT

A method for promoting the flow of a solidifiable liquid or molten material upon the surfaces of a body and particularly such a method applied to a process of rotational casting or molding requiring charging a mold cavity with the solidifiable liquid or molten material and rotating the mold about each of two mutually inclined axes with a speed that is progressively decreased substantially in accord with the progressive increase in viscosity of the solidifiable material.

4 Claims, 3 Drawing Figures

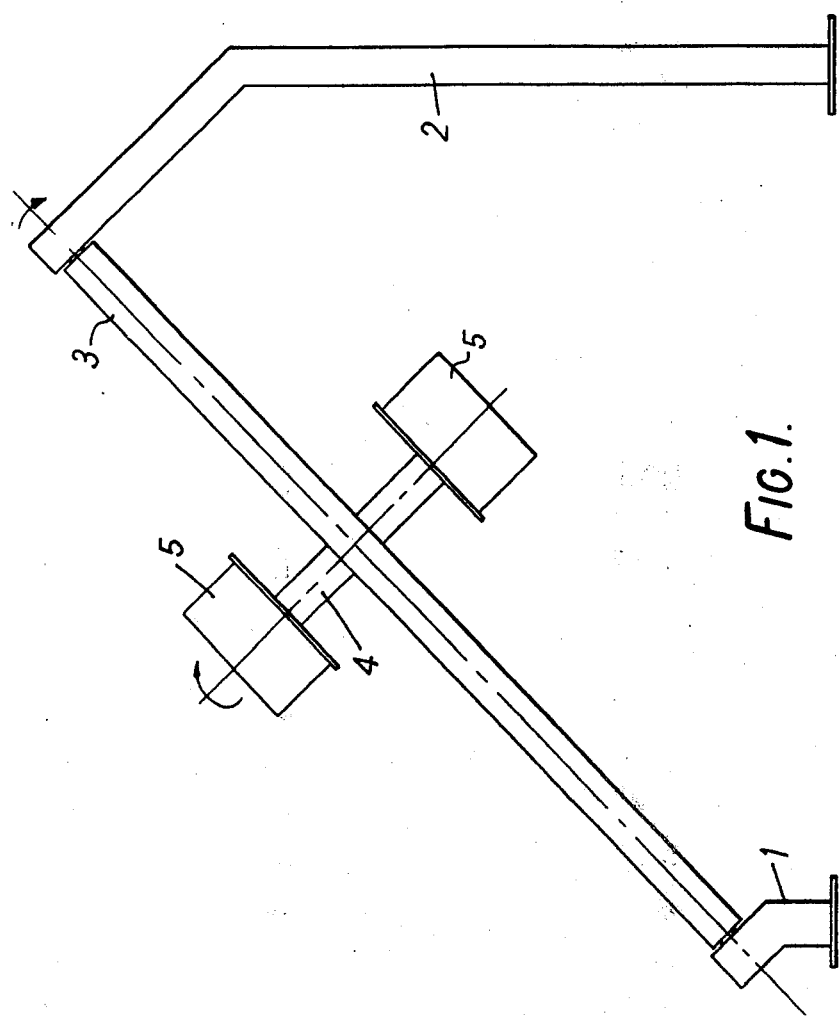

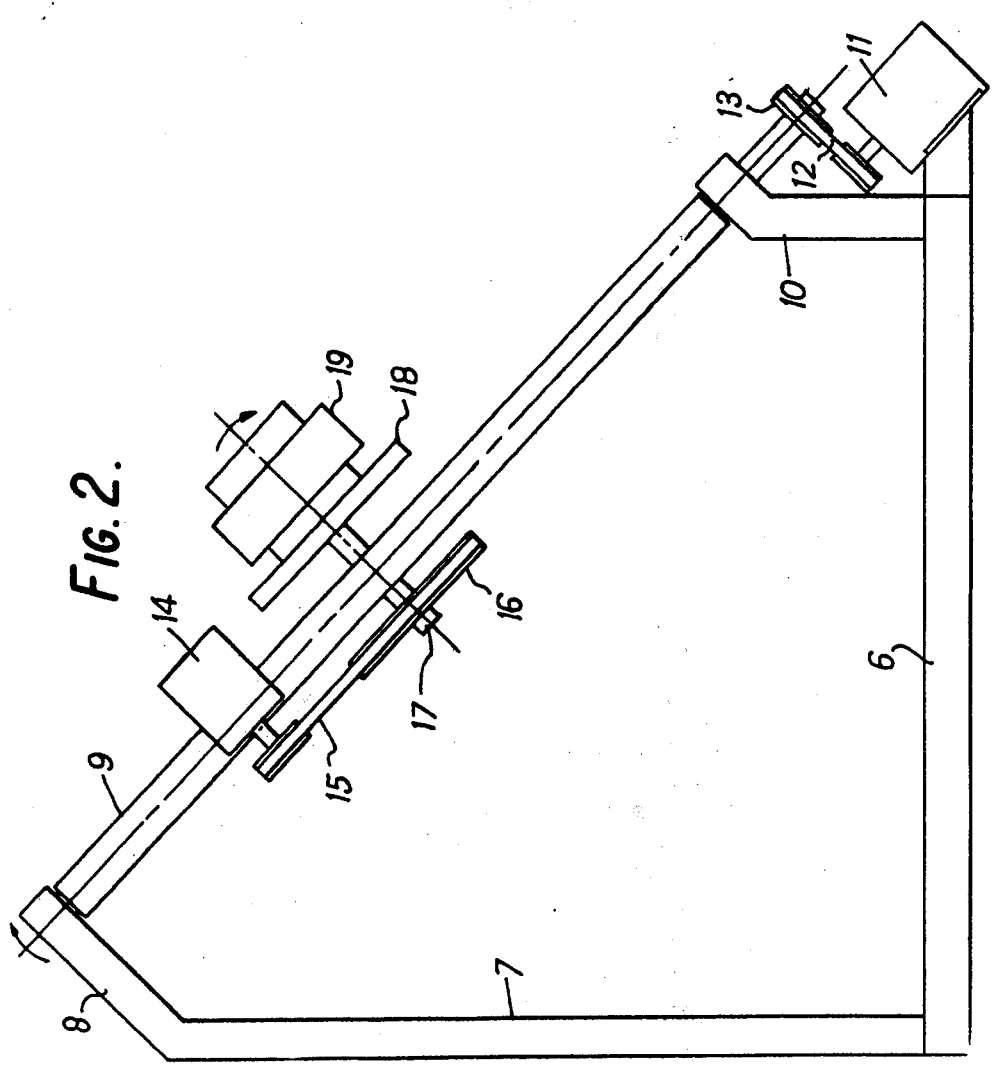

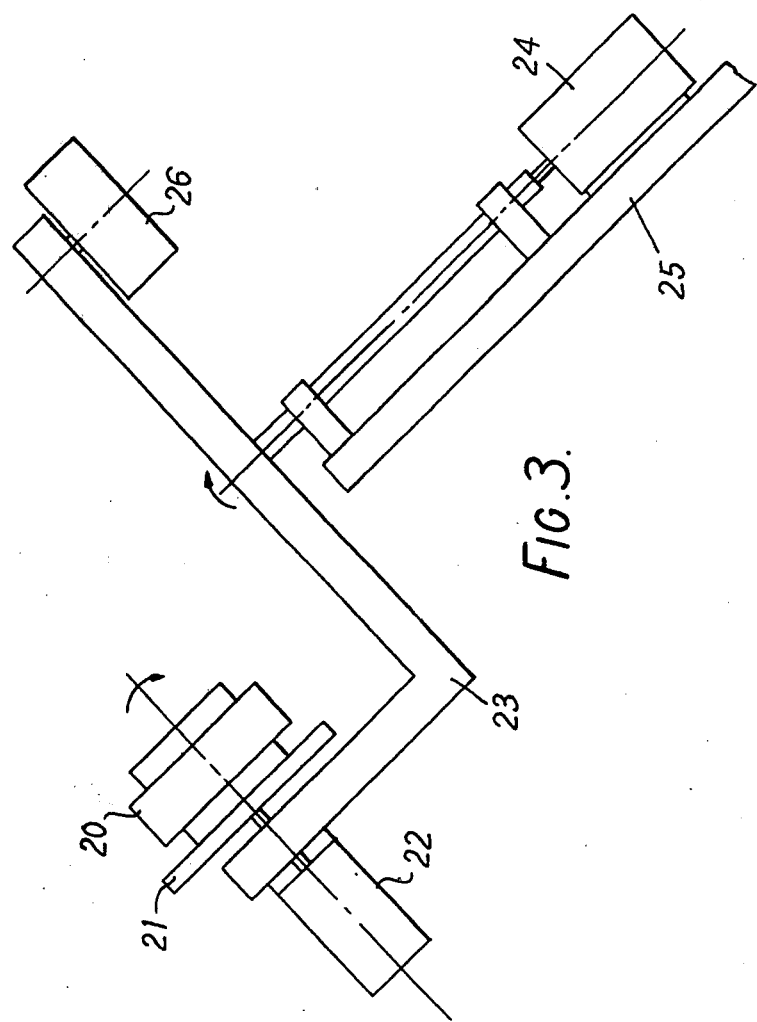

ROTATIONAL MOLDING OF HOLLOW ARTICLES OF UNIFORM WALL THICKNESS

This is a continuation of application Ser. No. 597,482, filed July 21, 1975 now abandoned, which was a continuation-in-part application from my application Ser. No. 353,294 filed Apr. 23, 1973 and now abandoned.

BACKGROUND OF THE INVENTION

Methods of rotational casting particularly applied to the formation of cast articles from synthetic plastic resins are well known. In such methods articles are cast in or on molds by placing powdered plastic resin material on to a mold surface heated to a temperature sufficient to melt the plastic resin. The heated mold is rotated simultaneously about two axes perpendicular to each other. The plastic resin melts on the surfaces of the hot mold and is caused to flow over the entire surface of the mold cavity by rotation of the mold. The final thickness of the casting produced is dependent solely on the amount of material initially introduced into the mold. Rotational casting provides castings, with practically no wastage of raw materials, the molded articles being stress-free and of wide variety of shape and size. Rotational casting may also be applied to certain metals and also to glasses. Hitherto, methods of rotational casting have generally employed apparatus wherein the mold is caused to rotate about two axes permanently in a vertical and a horizontal plane respectively, and the rotational speed about each axis is kept constant throughout if uniformity in the casting wall thickness is required (see, for example, U.S. Pat. No. 3,275,733). It has nevertheless been found that with such methods the wall thickness and the internal surface finish of the castings is subject to considerable and uncontrollable unevenness. Moreover, such methods do not lend themselves easily to the production of quality castings from materials introduced into the molds as liquids, e.g. polymerizable plastics, prepolymers, resin monomers etc., as distortion of the cast and gross variations in wall thickness occur.

A method has now been developed which substantially overcomes the aforesaid disadvantages.

SUMMARY OF THE INVENTION

According to one aspect of this invention there is provided a rotational molding process comprising the steps of:

charging a mould cavity with a liquid or molten material which is solidifiable by progressive increase in the viscosity thereof and is to be molded into a required cast of the mold cavity;

increasing progressively the viscosity of said material in the mold cavity while simultaneously subjecting the mold to a composite motion about first and second mutually inclined axes of which neither is permanently in the horizontal plane or in the vertical plane, said composite motion comprising a first motion component selected from rotation or oscillation or a combination of rotation and oscillation about said first axis at a first rate of motion and a second motion component selected from rotation or oscillation or a combination of rotation and oscillation about said second axis at a second rate of motion, at least one of said rates of motion being decreased progressively substantially in accord with the progressive increase of the viscosity of the material being molded until the cavity defining surfaces of said mold cavity are internally covered overall by solidified material to a predetermined, substantially uniform thickness forming said required cast of the mold cavity; and removing the said cast from the mould.

According to another aspect of the present invention, there is provided a rotational molding process comprising the steps of:

charging a mold cavity with a liquid or molten material which is solidifiable by progressive increase in the viscosity thereof and is to be molded into a required cast of the mold cavity;

increasing progressively the viscosity of said material in the mold cavity while simultaneously subjecting the mold to a composite motion about first and second mutually perpendicular axes one of which is maintained at an angle of inclination to the vertical plane of about 45°, said composite motion comprising a first motion component selected from rotation or oscillation about said first axis at a first rate of motion and a second motion component including rotation about said second axis at a second rate of motion, at least one of said rates of motion being decreased progressively substantially in accord with the increase of the viscosity of the material being molded until the walls of said mold cavity are internally covered overall by solidified material to a predetermined, substantially uniform, thickness forming said required cast of the mold cavity; and removing said cast from the mold.

The mold may be heated if necessary to melt the material if initially solid or to effect solidification of the liquid, while being subjected to composite motion, and if heated is subsequently cooled prior to removing the cast from the mold.

It will be appreciated that the method of the invention generally requires that the force of gravity acts on both the axes of rotation of the mold.

It has been found that such an arrangement confers several beneficial advantages to the process of rotational casting. One advantage is that the rates of the first and second motion components of the mold about the said two axes are no longer as critical. Another advantage is that the ratio of the two rates of motion about the two respective axes is no longer critical, although preferably this ratio is maintained substantially constant.

Indeed, unexpectedly it has been discovered that castings with even better control of thickness in hollow parts, are produced when the absolute, as well as the relative, rates of motion about the two said axes are deliberately varied during the casting cycle, the variation being a progressive decrease that accords substantially with the progressive increase in viscosity of the material being molded. In fact, satisfactory castings have been achieved in tests even when one motion component was stopped during a part of the casting cycle. Where the motion component is rotation, it may be continued in the opposite direction after a sudden stoppage during the casting cycle. Although such rotation and contra-rotation is in effect a sudden velocity change (velocity being a vector quantity), the speed per se (i.e. irrespective of direction) is in effect not changed suddenly but only progressively decreased substantially in accord with the progressive increase in the viscosity of the material being molded.

The program of variation of the two rates of motion as well as their relative magnitude varies from material to material depending upon its nature such as for example its initial melt or prepolymeric viscosity, viscosity index, and rate of build up of viscosity with time as the polymerization of cooling proceeds.

Equally, the program of variation of the two rates of motion also depends upon the relative dimensions of the mould, and its surface characteristics (for example, roughness etc.). Depending upon the mold configuration and the surface geometry of the required casting, it is occasionally desirable to impart oscillatory motion about one or both of the said two axes, rather than apply continuous or continual rotation as described above. This is particularly applicable when molding articles with open cavities, where for example an oscillatory motion can be provided by reversing the direction of rotation about one or both of the said two axes within a single revolution for better control of the spread of the material during the casting cycle.

For a given casting material and mold, it is relatively easy for those skilled in the art to ascertain the best possible combination of heating and/or cooling cycles, speeds of rotation or oscillation, their relative magnitude and the total cycle time.

Yet another advantage of this novel casting process is that the casting material is distributed more quickly on the body of the mold than when the teachings of the prior art are practised. Thus there is a saving of time. For example, in a typical case of molding a 3' × 2' × 2' rectangular tank, i have obtained a cycle time of 6 minutes, whereas a cycle time of 12–15 minutes was more usual according to the teachings of the prior art.

More advantages of the present invention will become apparent from the following description.

BRIEF DESCRIPTION OF THE DRAWINGS

The invention is now described with reference to the accompanying drawings in which FIG. 1 illustrates schematically a rotational casting device operating in accordance with the method of the invention, and FIGS. 2 and 3 illustrate schematically alternative devices each also operating in accordance with the method of the invention.

DESCRIPTION OF THE PREFERRED EMBODIMENTS

In a preferred embodiment, the first and second axes of rotation of the mold are set at 90° to each other and in addition the first axis of rotation is set at an angle of 45° to the horizontal. Both axes may rotate or oscillate (i.e. change their rotational direction) independently of each other. According to a further embodiment of the invention the relative speed of rotation of the mold about the two axes is varied, i.e. progressively decreased, during molding according to the progressive increase in the viscosity of the liquid molten substance being cast. Moreover, it may be desirable to vary the relative angle between the axes of rotation and/or the set angle of one axis of rotation with the vertical or horizontal during rotation of the mold. By so varying the relative speeds, the quality of the cast can be improved and in particular a controlled wall thickness obtained.

In the embodiment illustrated in FIG. 1, two support members 1 and 2 carry at their upper ends an elongate member 3 rotatable about a first axis of rotation running centrally and longitudinally therethrough, the rotational direction being indicated by the arrow. It will be seen that the axis of rotation of the rotatable member 3 extends at a set angle to the horizontal which is substantially 45°. In conjunction with the rotatable member 3, there is provided a second elongate rotatable member 4 (shorter than the first) with its axis, i.e. the second axis of rotation, extending centrally and longitudinally therethrough. The direction of rotation of the member 4 is indicated by the arrow. Mounted at each end of the member 4 are molds 5.

It will be seen that the axis of rotation of the rotatable member 4 extends at right angles to the axis of rotation of the rotatable member 3.

The molds 5 are subjected to the combination of the rotations about both the first axis of rotation and the second axis of rotation.

In the embodiment illustrated in FIG. 2, a horizontally extending support member 6 carries a substantially vertical strut member 7 with a linked inclined mounting component 8. This component serves as a mount for the upper end of a longitudinally extending rotatable member 9, the lower end of which is supported in a truss member 10. At the base end of truss member 10 is an electric drive motor 11 which, through a drive coupling 12, 13, serves to impart rotational motion to the rotatable member 9.

Towards the upper end of the member 9 there is mounted a further electric drive motor 14. This motor is fed with the requisite electric current supply through slip rings. The shaft of this drive motor 14 serves to impart a rotational drive to a shaft 17 through a coupling link 15, 16. The shaft 17 has mounted on it a support table 18 and on this there is mounted a mold 19. With the arrangement as illustrated in FIG. 2, the material undergoing shaping in the mold 19 is subjected to a rotational motion compounded of the motion about the first axis — which is set at 45° to the horizontal — plus that of the second axis of rotation.

In the embodiment shown in FIG. 3, the mold body 20, held on a mold carriage and shaft assembly 21 and driven by a motor 22, is supported on a right-angled frame 23 which is itself supported and driven by a motor/shaft assembly 24 that is mounted on a fixed support 25 inclined at substantially 45° to the horizontal. The mold 20, mould carriage 21 and the motor 22 are counter-weighted by a weight 26 on an extension of the right-angled frame 23. The frame 23 is fixed at right angles to the motor/shaft assembly 24. The power for the motor 22 and heating coils in the mold body 20 is carried through slip rings (not shown) on the shaft assemblies 24 and 21.

Suitable means (not shown) for heating and cooling the mold, for selectively connecting the mold interior to atmosphere and pressure (or vacuum), for the introduction of liquids, gas, metal, glass or powder etc., to the mould and controls therefor may be provided through suitable rotating joints. Alternatively, the mold assembly as described above may be introduced into suitable (hot/cold etc.) chambers in any given sequence, or the chambers may be wheeled to the stationary machine.

The liquid metal, glass, powder or other material to be molded may be introduced into the stationary mold, the feeder plugged and the assembly rotated as described above or the molten metal, glass, powder, or other material to be molded may be introduced into the mold through a central opening and/or through rotating joints.

The method of rotational casting according to the invention may be employed to produce castings for a variety of uses both decorative as well as functional. For example, the method has found particular application for the production of lost patterns having internally located hollow cavities within their body structure.

There will now be described specific examples of methods according to the invention as performed in apparatus such as that described above with reference to the accompanying drawings.

In each of the following examples numbered 1 through 5, the casting to be produced is a hollow parallelepiped having external dimensions 10" × 12" × 6" and a uniform predetermined small wall thickness, e.g. less than half an inch. The quantity of material required for the casting is pre-calculated in dependence upon the uniform wall thickness required. A mold cavity having dimensions corresponding to the said external dimensions of the casting to be produced, is initially charged with this pre-calculated quantity of material with the mold mounted on the apparatus such that its largest (12 inch) dimension is along the longer first axis of the apparatus (e.g. axis 3 or 9 of FIGS. 1 or 2 respectively) and its smallest (6 inch) dimension is along the shorter second axis of the apparatus (e.g. axis 4 or 17 of FIGS. 1 or 2 respectively). Said charging of the mold cavity may be performed either with the mold stationary or with the mold rotating about one or both of the first and second axes with a respective initial velocity.

EXAMPLE 1

A casting of polyurethane material is to be produced. The charging material comprises a mixture of
(i) 200 parts by weight of a 600 molecular weight propoxylated triol, glycerine initiated (e.g. the product sold in the United Kingdom by Sigma Chemie (United Kingdom) Limited under the trade mark "Sigma-Trol 600") having an initial viscosity at room temperature of about 500 centipoises,
(ii) a stoichiometric equivalent amount of a polymeric diphenyl-methane di-isocyanate (e.g. the product sold in the United Kingdom by Bayer under the trade name "Desmodur VL" having an isocyanate equivalent weight of approximately 140 and an initial viscosity at room temperature of about 600 centipoises), and
(iii) a suitable amount (e.g. one-fourth percent by weight of said triol) of a catalyst such as dibutyl tin di-laureate.

This mixture has a viscosity of about 550 centipoises and a gelling time of about 10 minutes at an initial temperature of 25° C.

The mold is charged with this mixture and is rotated about both axes, the initial rotational speed about the longer first axis being of the order of about 80 r.p.m. and the initial rotational speed about the shorter second axis being of the order of about 140 r.p.m. Each of these rotational motions is continued in the same direction for the duration of the gelling time of the material, but the rate thereof (i.e. the speed) is progressively and continuously reduced towards zero in accord with the progressive increase in viscosity of the material as it proceeds to gelation. In other words, the rotational speed about the first axis is reduced at an average rate of about 8 r.p.m./min. and the rotational speed about the second axis is reduced at an average rate of about 14 r.p.m./min. The two rotational motions are thus effectively zero upon expiration of the gelling time of about 10 minutes, the mold cavity then containing the required hollow casting thereof with a substantially uniform wall thickness predetermined by the quantity of materially initially charged into the mould cavity. The casting may then be left in the mold or removed therefrom for curing.

EXAMPLE 2

The starting material with which the mold cavity is charged is a mixture comprising an epoxy resin and an amine. The mixture preferably comprises:
(i) an epoxy resin such as that sold in the United Kingdom by Shell under the trade name "Epikote 834",
(ii) 10–15% by weight of the epoxy resin of a glycidal ether, e.g. cresyl glycidal ether, and
(iii) a stoichiometric equivalent amount (probably about 10% of the weight of the epoxy resin) of di-ethylene triamine.

This mixture has a gelling time of about 20 minutes and an initial viscosity of approximately 1000 centipoises at a temperature in the range of approximately 35°–40° C.

The mold is charged with this mixture and is initially rotated about both axes, the initial rotational speed about the longer first axis being of the order of about 40 r.p.m. and the initial rotational speed about the shorter second axis being of the order of about 70 r.p.m. Each of these rotational motions is continued in the same direction for the duration of the gelling time, but the rate thereof (i.e. the speed) is progressively and continuously reduced towards zero in accord with the progressive increase in viscosity of the material as it proceeds to gelation. In other words, the rotational speeds about the first and second axis are each reduced at an average rate of about 2 r.p.m./min. and 3.5 r.p.m./min. The two rotational motions are thus effectively zero upon expiration of the gelling time of about 20 minutes, the mold cavity then containing the required hollow casting thereof having a substantially uniform wall thickness predetermined by the quantity of material with which the mold cavity was initially charged. The casting may then be left in the mold or removed therefrom for curing.

EXAMPLE 3

The starting material with which the mold cavity is charged is a mixture comprising an epoxy resin and a polyamide. The mixture preferably comprises an epoxy resin such as that specified in Example 2, and a stoichiometric equivalent amount of a polyamide resin (such as that sold in the United Kingdom by Cray Valley under the trade name "Genamid 2000"). This mixture has a gelling time of about 20 minutes and an initial viscosity in the range of about 1000 to about 2500 centipoises at an initial temperature of 50° C. The mold is charged with this mixture and is rotated about both axes, the initial rotational speed about the longer first axis being in the range of about 40 r.p.m. to about 16 r.p.m. (depending on the initial viscosity) and the initial rotational speed about the shorter second axis being in the range of about 70 r.p.m. to about 28 r.p.m. (depending on the initial viscosity). Each of these two rotational motions is continued in the same direction for the duration of the gelling time of about 20 minutes, but the rate thereof (i.e. the speed) is progressively and continuously reduced towards zero in accord with the progressive increase in viscosity of the material as it proceeds to gelation. The two rotational motions are thus effectively zero upon expiration of the gelling time, the mold cavity then containing the required hollow casting thereof having a substantially uniform wall thickness predetermined by the quantity of material with which the mold cavity was initially charged. The casting may then be left in the mold or removed therefrom for curing.

EXAMPLE 4

A casting of a thermoplastic material is to be produced. The preferred thermoplastic material of this example comprises a virtually cross-linked thermoplastic polyurethane composition such as that sold in the United Kingdom under the trade mark "Sigma-Urane 1775" by Sigma Chemie (United Kingdom) Limited. This composition has an initial viscosity of approximately 2000 centipoises at 120° C. and after charging the mold at this temperature with the composition, the cooling rate of the mold is adjusted to provide a gelling time of about 15 minutes for the composition as the speeds of rotation of the mold are progressively and continuously decreased towards zero from their initial values in accord with the progressive increase in viscosity of the composition as the latter gels. The initial value of the rotational speed about the longer first axis is approximately 20 r.p.m. whereas the initial value of the rotational speed about the shorter second axis is approximately 35 r.p.m. Each of these two rotational motions is continued in the same direction for the duration of the gelling time, but is reduced as aforesaid, the average reduction rate being of the order of 1.1/3 r.p.m./min. and 2.1/3 r.p.m./min. respectively. The two rotational motions are thus effectively zero upon expiration of the gelling time of about 15 minutes, the mold then containing the required hollow casting thereof having a substantially uniform wall thickness predetermined by the quantity of the composition with which the mold cavity was initially charged. The casting may then be left in the mold or removed therefrom for curing.

EXAMPLE 5

The casting to be produced in one consisting of an expanded foamed rigid material. Preferably, the starting composition comprises a mixture of (i) a 3000 molecular weight propoxylated aminoglycerine polyol (such as that sold in the United Kingdom under the trade mark "Sigma-Trol 3000" Sigma Chemie (United Kingdom) Limited), (ii) 10-20% by weight of said polyol of a blowing agent such as Freon 11, and (iii) a stoichiometric equivalent amount of a curing agent such as diphenyl-methane di-isocyanate (having an isocyanate equivalent weight of 127). This mixture may be pre-mixed immediately prior to its being charged into the mold cavity in liquid or alternatively in froth (i.e. pre-foamed) form, or may be formed by and during introduction into the mold of its constituents. The mixture has a gelling time of about 15 minutes and an initial viscosity of approximately 2500 centipoises at a temperature of 25° C.

The mold charged with this mixture is rotated about both axes, the initial rotational speed about the longer first axis being approximately 16 r.p.m. and the initial rotational speed about the shorter second axis being approximately 28 r.p.m. Each of these two rotational motions is continued in the same direction for the duration of the gelling time, i.e. about 15 minutes, but the rate thereof (i.e. the speed) is progressively and continuously reduced towards zero in accord with the progressive increase in viscosity of the material as it proceeds to gelation. In other words, the rotational speeds about the first and second axes are reduced at an average rate of about 1.065 r.p.m./min. and 1.87 r.p.m./min. respectively. The two rotational motions are thus each effectively zero upon expiration of the gelling time of approximately 15 minutes. During gelation, the heat of reaction and/or the heat introduced into the mold from an external source, vaporizes the blowing agent (Freon 11) causing progressive swelling up of the flowing mixture, i.e. foaming, the other constituents of the mixture reacting with one another to cause a progressive increase in viscosity of the mixture towards gelation. At the end of the gelling time, the mold cavity thus contains the required hollow casting thereof as a substantially rigid expanded or foamed plastics material, which casting has a substantially uniform wall thickness that is predetermined by the quantity of the mixture with which the mold cavity was initially charged. The casting may then be left in the mold or removed therefrom for curing.

In the following examples numbered 6 through 10, the plastics material casting to be produced is a hollow lost pattern for use in the metal casting of a camshaft for an automobile engine. The lost pattern thus has a complicated shape and for example may have overall dimensions of about 18 inches in length and about 2 inches in width. The quantity of plastics material required for the rotational casting of the hollow lost pattern is pre-calculated in dependence upon the uniform wall thickness required therefor. This predetermined quantity of material is introduced into a mold cavity having dimensions corresponding to the external dimensions of the lost pattern to be rotationally cast or molded, the mold being mounted on the apparatus such that its length is along the longer first axis of the apparatus (e.g. axis 3 or 9 of FIG. 1 or 2 respectively) and its width is along the shorter second axis of the apparatus (e.g. axis 4 or 17 of FIG. 1 or 2 respectively). The introduction of said material into the mold cavity, i.e. the charging thereof, may be performed either with the mold stationary or with the mold rotating about one or both of the first and second axes with a respective initial velocity.

EXAMPLE 6

The material with which the mold is charged comprises a mixture as set out in Example 1. However, in this case the initial rotational velocity of the mold about the longer first axis is of the order of 120 r.p.m. and the initial rotational velocity of the mold about the shorter second axis is of the order of 20 r.p.m. The magnitude of each of these velocities is reduced progressively towards zero in accord with the progressive increase in viscosity of the material towards infinity. However, in contrast to Examples 1 to 5, the direction of rotation about one or each axis is suddenly (effectively instantaneously) changed at least once during the gelling time, the rotational speed in the contra or rearward direction commencing at the value of the rotational speed in the forward direction immediately preceding the change in direction. In other words, the initial speed in one direction about one or each axis is progressively reduced to an intermediate speed in accord with the progressive increase in viscosity, is suddenly stopped and then recommenced immediately at this intermediate speed in the opposite direction and again progressively reduced towards zero in accord with the continued increase in viscosity of the material. One or more further changes in direction of rotation about one or each axis may be effected, the recommenced rotational speed being equal to, but in the opposite direction to, the rotational speed immediately preceding the change in direction.

EXAMPLE 7

The material with which the mold is charged comprises a mixture as set out in Example 2. However, in this case the initial rotational velocity of the mold about the longer first axis is of the order of 60 r.p.m. and the initial rotational velocity of the mold about the shorter second axis is of the order of 10 r.p.m. The magnitude of each of these rotational velocities is progressively reduced towards zero in accord with the progressive increase in viscosity of the material, one or more sudden changes in the direction of rotation about at least one of the axes being effected during gelation (i.e. within the gelling time of about 20 minutes) in the manner set out in Example 6.

EXAMPLE 8

The material with which the mold is charged comprises a mixture as set out in Example 3. However, in this case the initial rotational velocity of the mold about the longer first axis is in the range of about 60 r.p.m. to about 25 r.p.m. (depending on the initial viscosity) and the initial velocity of the mold about the shorter second axis is in the range of about 10 r.p.m. to about 4 r.p.m. (depending on the initial viscosity). The magnitude of each of these rotational velocities is progressively decreased towards zero in accord with the progressive increase in viscosity of the material, one or more sudden changes in the direction of rotation about at least one of the axes being effected during gelation (i.e. within the gelling time of about 20 minutes) in the manner set out in Example 6.

EXAMPLE 9

The material with which the mold is charged is the thermoplastic composition set out in Example 4. However, in this case the initial rotational velocity of the mold about the longer first axis is about 30 r.p.m. and the initial rotational velocity of the mold about the shorter second axis is about 5 r.p.m. The magnitude of each of these rotational velocities is progressively decreased towards zero in accord with the progressive increase in viscosity of the material, one or more sudden changes in the direction of rotation about at least one of the axes being effected during gelation (i.e. within the gelling time adjusted by appropriate cooling of the mold to be about 15 minutes) in the manner set out in Example 6.

EXAMPLE 10

The material with which the mold is charged comprises a mixture as set out in Example 5. However, in this case the initial rotational velocity of the mold about the longer first axis is about 25 r.p.m. and the initial rotational velocity of the mold about the shorter second axis is about 4 r.p.m. The magnitude of each of these rotational velocities is progressively decreased towards zero in accord with the progressive increase in viscosity of the material, one or more sudden changes in the direction of rotation about at least one of the axes being effected during gelation (i.e. within the gelling time of about 15 minutes) in the manner set out in Example 6.

The provision of one or more changes in direction of rotation about at least one of the axes as explained in Example 6, is particularly appropriate where the casting or molding to be produced is to have a complicated surface configuration (e.g. a relief surface having a plurality of indentations and projections) or is to have an open end (e.g. a barrel-shaped article or cup-shaped article). Such changes in the direction of rotation about an axis amount, in effect, to an oscillation about that axis. This is especially and more clearly so if the changes in direction occur within one revolution of commencement or recommencement of the motion, as is particularly the case where an open-ended article is to be rotationally molded.

It will be noted from Examples 6 through 10 that a change in direction of rotation involves a sudden reduction in the speed to zero and a sudden increase in the speed to that existing immediately prior to the change. Nevertheless, the change is virtually instantaneous and in effect does not cause a departure from the requirement that at least one of the rates of motion decreases progressively to zero in accord with the progressive increase in viscosity of the material being molded.

It will be apparent from Examples 3 and 8, relating to the rotational molding of a mixture of an epoxy resin and a polyamide, that where the starting material requires heat for gelation and curing, this may be externally supplied to the mold while it is being subjected to the composite motion about the two axes.

It will also be apparent from Examples 4 and 9, relating to the rotational molding of a thermoplastic material initially introduced into the pre-heated mold in a molten state, that where the starting material requires cooling for gelation and curing, this may be externally supplied to the mold while it is being subjected to the composite motion about the two axes. This externally supplied cooling may be arranged and adjusted to provide the desired progressive increase in viscosity of the material in accord with which the magnitude of at least one of the rates of motion is progressively decreased.

Furthermore, it will be noted that in Examples 1–3, 5–8 and 10, two or more chemicals are provided that react with one another to form the molding by gelation, whereas in Examples 4 and 9 gelation occurs through a physical process of a loss of heat of the material.

In each of the above examples, the material being molded continuously and progressively increases in viscosity with time until gelation when the material becomes substantially rigid and has a virtually infinite viscosity. The gelation stage reached upon termination of mold motion and expiration of the gelling time, is generally a pre-cure stage and the gelled material may, if necessary, be left in the mold until it is sufficiently rigid for it to be withdrawn. Final curing may be performed with the molding or cast removed from the mold at room temperature or at elevated temperatures as appropriate. Nevertheless, it should be noted that the rate of progressive increase in the viscosity of the material being rotationally cast or molded, is not in general lineal, i.e. constant, with respect to time. The rate of any applied heating or cooling of the mold, the type and nature of any chemical reaction involved during molding, the bulk or weight of the material initially introduced into the mold, and the heat capacity and conductivity of the mold body have an effect in determining the actual rate of viscosity increase at any particular instant of time during the process cycle. A viscosity/time relationship for a particular material can be obtained in a separate, initial test using a viscometer and this relationship used, as a first approximation, as the basis for determining an empirical speed/time relationship to be provided for each axis during a rotational molding process with that material. Modifications may then be made to the two empirical speed/time relationships in the light of the actual molding conditions existing during one or more test runs of the rotational molding process to provide two speed/time relationships that are a better approximation to the preferred requirement that the rate of speed decrease about each axis accords with the rate of viscosity increase of the material being molded, and thus refines the process such that the best possible production results can be obtained.

Furthermore, it will be appreciated that the above-quoted rates of reduction of the rotational speeds in Examples 1, 2, 4 and 5 are not constant rates for the entire duration of the casting or molding cycle, but are in fact only average values as determined from the empirical speed/time relationships obtained from pre-production viscometer studies. This non-constancy in the rates of reduction of the rotational speeds arises for example for many materials where the rate of viscosity increase is less during the first few minutes of the casting cycle than during the last few minutes of the cycle.

It will also be apparent from the above, non-limiting examples that with a given mold, the ratio of the two rates of motion is preferably maintained constant during the gelling time and that the initial absolute value of each rate of motion is dependent upon the initial viscosity of the material being molded, the lower the initial viscosity the higher the initial starting speed.

Although the initial viscosity of the various materials specified in the above, non-limiting examples is in the range of about 500 to 2500 centipoises, it is envisaged that this invention is applicable to a wide range of materials which in liquid or molten form have an initial viscosity in the range of about 5 centipoises to about 15,000 centipoises.

Since several changes can be made in the rotational molding process (described above by way of example) without departing from the spirit of this invention, it is intended that all matter contained in the above description and/or shown in the accompanying drawings shall be interpreted as illustrative and not in a limiting sense.

What is claimed is:

1. A rotational molding process for producing a hollow cast of uniform wall thickness comprising the steps of:
   charging a mold cavity with a liquid or molten material having an initial value of viscosity;
   subjecting the mold to a composite motion about first and second mutually inclined axes of which the first axis is permanently neither in the horizontal plane nor in the vertical plane and of which the second axis is permanently neither in the horizontal plane nor in the vertical plane, said composite motion comprising a first angular motion component at a first rate of motion about said first axis and a second angular motion component at a second rate of motion about said second axis, decreasing at least one of said rates of motion in effectively a continuous and progressive manner towards zero in accord with the increase in viscosity of the material from said initial value to gellation of the material, said first axis having an angle of inclination which is varied relative to said second axis during said molding process.

2. A rotational molding process for producing a hollow cast of uniform thickness comprising the steps of:
   charging a mold cavity with a liquid or molten material having an initial value of viscosity and
   subjecting the mold to a composite motion about first and second mutually inclined axes of which the first axis is permanently neither in the horizontal plane nor in the vertical plane and of which the second axis is permanently neither in the horizontal plane nor in the vertical plane, said composite motion comprising a first angular motion component at a first rate of motion about said first axis and a second angular motion component at a second rate of motion about said second axis, decreasing at least one of said rates of motion in effectively a continuous and progressive manner towards zero in accord with the increase in viscosity of the material from said initial value to gellation of the material, one of said axes having an angle of inclination which is varied relative to a horizontal plane during said molding process.

3. A process according to claim 1, wherein the said liquid or molten material is a mixture of chemically inter-reactive constituents, the chemical reaction being such as to increase progressively the viscosity of the mixture from said initial value.

4. A process according to claim 2, wherein the said liquid or molten material is a mixture of chemically inter-reactive constituents, the chemical reaction being such as to increase progressively the viscosity of the mixture from said initial value.

* * * * *